United States Patent [19]

Kennedy

[11] Patent Number: 4,969,920
[45] Date of Patent: Nov. 13, 1990

[54] INTERNAL AIRFLOW CHECK VALVE AND METHOD FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 502,724

[22] Filed: Apr. 2, 1990

[51] Int. Cl.⁵ ............................................. F16D 35/00
[52] U.S. Cl. .................................. 192/58 B; 192/82 T
[58] Field of Search ........................... 192/58 B, 82 T

[56] References Cited

U.S. PATENT DOCUMENTS 4,610,341  9/1986  Hauser et al. ...................... 192/58 B
4,924,987  5/1990  Kennedy ............................ 192/58 B Primary Examiner—Rodney H. Bonck
Attorney, Agent, or Firm—A. Michael Tucker

[57] ABSTRACT

A viscous fluid fan clutch assembly for a vehicle includes an internally-mounted pump plate for separating a working chamber from a reservoir. At least one fluid gate is provided in the pump plate to permit fluid flow from the reservoir to the working chamber. Only one discharge orifice is provided in the pump plate for permitting the return of fluid from the working chamber to the reservoir. Air vents are provided inbound of the discharge orifice to permit the passage of air between the reservoir and the working chamber. A check valve is mounted at the vent means to provide selective control of air through the air vents.

8 Claims, 3 Drawing Sheets

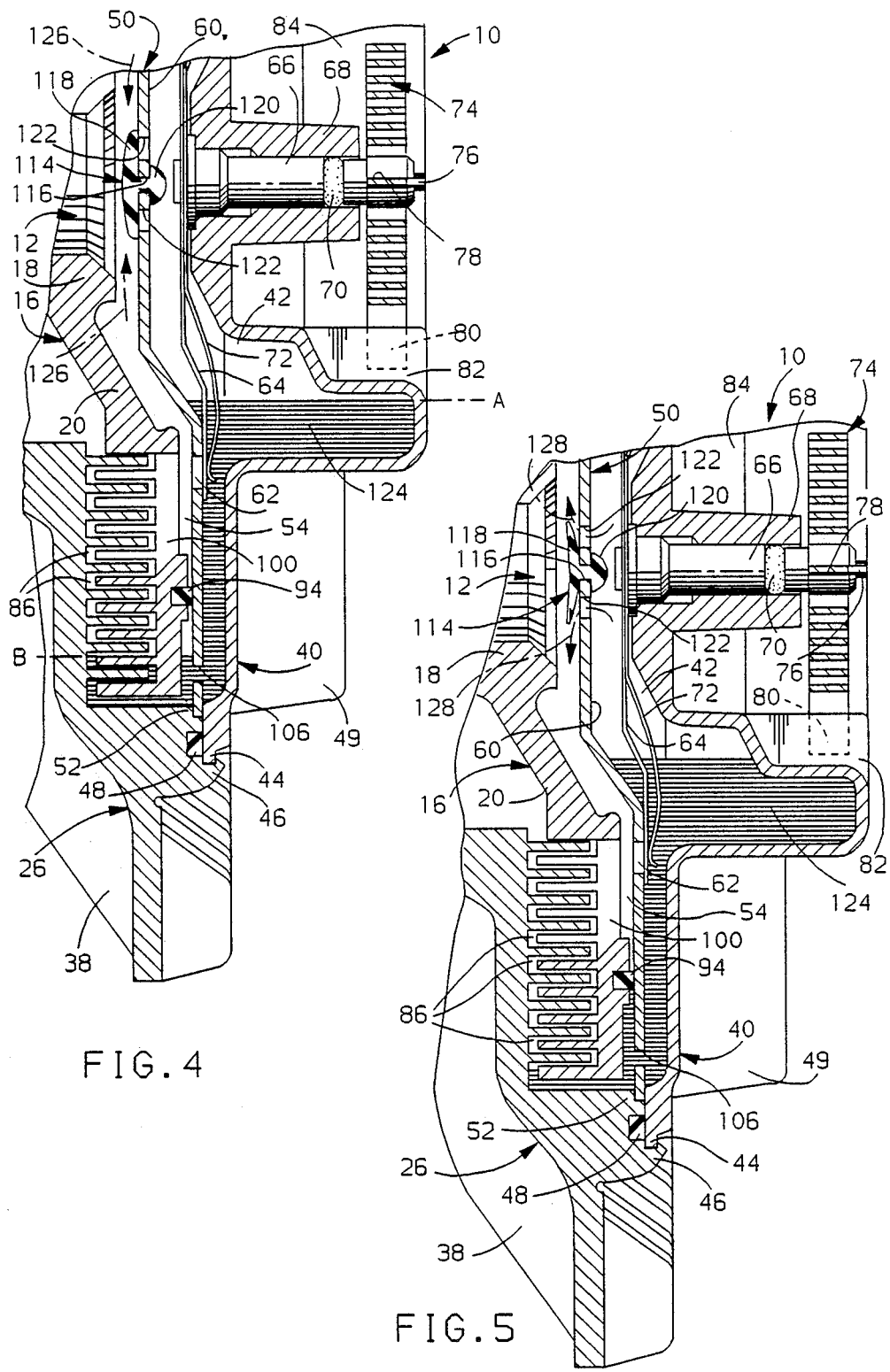

INTERNAL AIRFLOW CHECK VALVE AND METHOD FOR A VISCOUS FLUID CLUTCH

BACKGROUND OF THE INVENTION

1. Field of the Invention

The present invention relates generally to a viscous fluid coupling device. In particular, the present invention is concerned with an internally-mounted airflow check valve and associated method for a viscous fluid clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds when cooling is required and permits the fan to rotate at low speeds when cooling is not required. Thermostatic control of the fan through the clutch assembly limits high-speed fan rotation and reduces the load on an engine, resulting in horsepower gain and improved fuel economy for the vehicle. Furthermore, undesirable airflow noise which accompanies high-speed fan rotation is limited.

Generally, a clutch plate having lands and grooves is housed within the clutch assembly and mated to the body having complementary lands and grooves. A pump plate divides the assembly into a pair of internally-contained chambers, a working chamber and a reservoir. Gates in the pump plate permit selective flow of a viscous fluid from the reservoir to the working chamber and into a shear zone between the lands and grooves of the body and the clutch plate. Fluid shear in the lands and grooves transfers input torque from the clutch plate to drive the body and the attached fan.

When cooling is not required, gates in the pump plate are closed and the fluid in the shear zone is pumped into a pumping chamber. Discharge orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

When an engine is not running, fluid in the reservoir may settle at an equilibrium level in a conventional clutch assembly. Fluid pressure may cause the migration of fluid from the reservoir into the pumping chamber through the pump plate discharge orifices and into the shear zone. When an engine is next started, fluid that has migrated into the shear zone results in annoying high-speed operation of the fan. Such high-speed operation creates unwanted airflow noise from the fan blades. Also, excessive rotation of the fan of a cold engine increases the engine warm-up period.

The art continues to seek improvements. It is desirable that a viscous fluid clutch assembly provide thermostatic operation of a fan when cooling is required. Furthermore, it is desirable that a clutch assembly prevent the migration of fluid from a reservoir to the shear zone when the engine is not in operation, thereby eliminating high-speed operation and unwanted airflow noise when a cold engine is started.

SUMMARY OF THE INVENTION

The present invention includes a viscous fluid drive device particularly adaptable for a cooling fan clutch assembly of a vehicle. The present clutch assembly utilizes an airflow check valve to create a vacuum in the clutch assembly and prevent substantial migration of fluid through a pump plate discharge orifice from a reservoir into a pumping chamber when the engine is not running. The fluid is unable to achieve equilibrium, thereby preventing substantial fluid accumulation in the shear zone. The present apparatus and method are particularly effective for non-operational periods of the clutch assembly up to twenty-four hours.

In a preferred embodiment, the present invention relates to a viscous fluid fan clutch assembly for a vehicle and an associated method. The clutch assembly includes an internally-mounted pump plate for separating a working chamber from a reservoir. At least one fluid gate is provided in the pump plate to permit fluid flow from the reservoir to the working chamber. Only one discharge orifice is provided in the pump plate for permitting the return of fluid from the working chamber to the reservoir. Air vents are provided inbound of the discharge orifice to permit the passage of air between the reservoir and the working chamber. A check valve is mounted at the vent means to provide selective control of air through the air vents.

BRIEF DESCRIPTION OF THE DRAWINGS

FIG. 4 is a fragmentary view of the clutch assembly of FIG. 1 at rest illustrating the blockage of airflow through the airflow check valve and the prevention of fluid equilibrium in the reservoir and the working chamber.

FIG. 5 is a view similar to FIG. 4 illustrating the clutch assembly during operation after the fluid gates have been closed and the pump-out of fluid from the pumping chamber to the reservoir, as well as the passage of air through the airflow check valve.

DETAILED DESCRIPTION OF THE PREFERRED EMBODIMENTS

Figure 1:
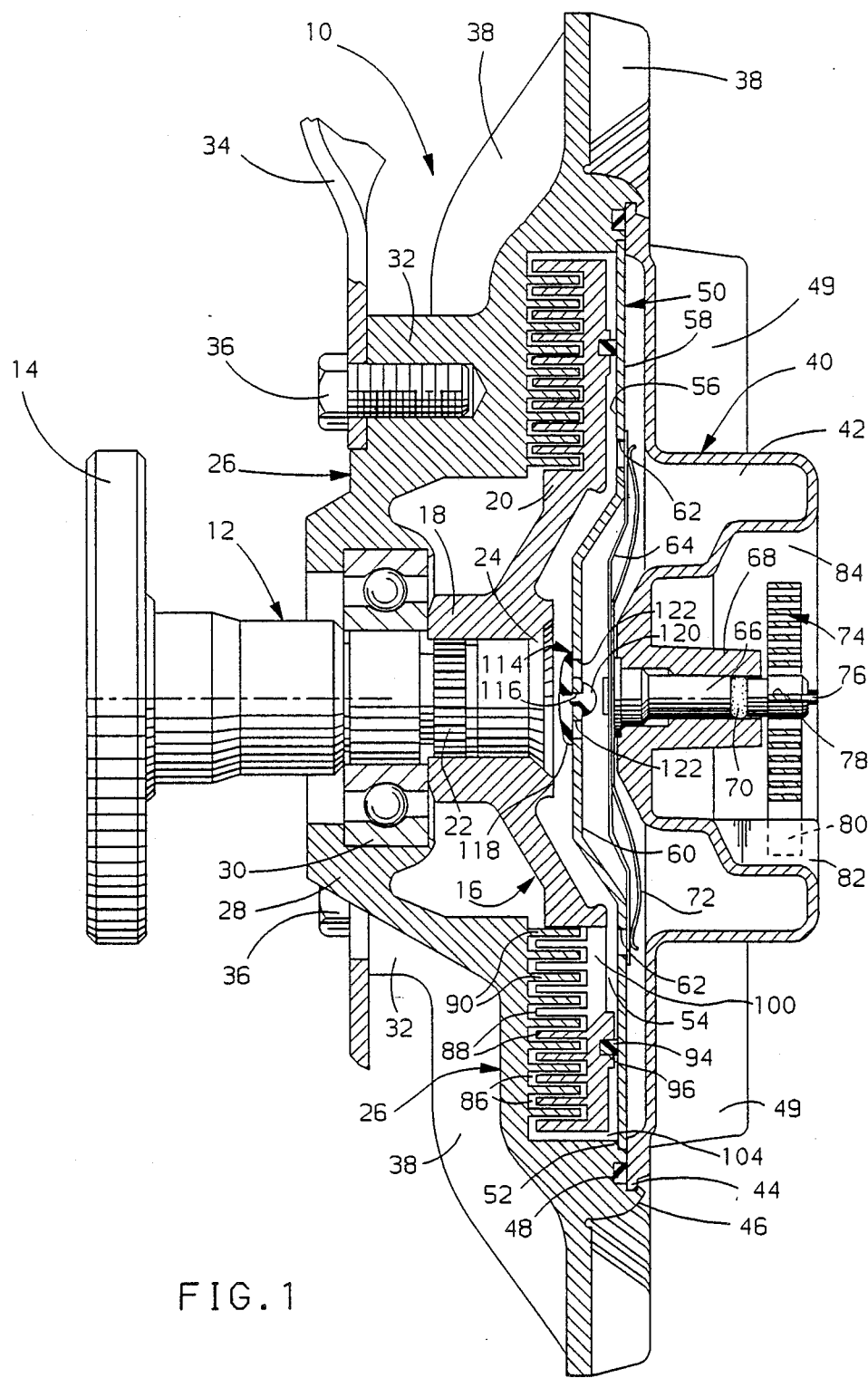
FIG. 1 is a partly sectional view of a viscous fluid clutch assembly and attached fan incorporating a pump plate according to the present invention, wherein the viscous fluid has been removed for purposes of clarity of illustration.

A viscous fluid clutch assembly indicated generally at 10 is illustrated in FIG. 1. The clutch assembly 10 includes a rotatably driven input shaft indicated generally at 12. The input shaft 12, which can be provided with multiple steps as illustrated in FIG. 1, preferably terminates at its first or innermost end in a flange 14. The flange 14 can be secured to a conventional engine-driven water pump pulley (not illustrated) to drive the clutch assembly 10 as described below.

A clutch plate indicated generally at 16 includes a central hub portion 18 and an annular disk portion 20. The central hub portion 18 receives a knurled portion 22 of the input shaft 12. In this construction, the rotational drive of the input shaft 12 is transferred to the clutch plate 16. A second end of the input shaft 12 can be machined as indicated at 24 to retain the clutch plate 16 on the input shaft 12. It is appreciated that other constructions, e.g., splining, can be utilized to drivingly connect the clutch plate 16 with the input shaft 12.

A housing indicated generally at 26 is a dished member having a central hub 28 rotatably mounted on the input shaft 12 by a bearing 30. A plurality of radially extending bosses 32 are formed on an exterior face of the housing 26. A multi-bladed fan 34, partially illustrated in FIG. 1, is attached by threaded fasteners 36 to the bosses 32. A plurality of fins 38 is provided on the outer surface of the housing 26 to dissipate heat transferred from a viscous fluid (not illustrated in FIG. 1) contained by the assembly 10.

A cover indicated generally at 40 is mounted to a front face of and cooperates with the housing 26 to form a reservoir 42 for the viscous fluid as described below. The cover 40 is a dished member having an annular outer edge 44 secured to the housing 26 by an annular retainer lip 46 spun over from the material of the housing 26. An annular seal 48, e.g., a formed-in-place gasket, is interposed between the edge 48 and a front face of the housing 26 to prevent leakage from the interior of the assembly 10. A plurality of fins 49 is provided on an outer surface of the cover 40 to dissipate heat transferred from the fluid.

A disk-like pump plate indicated generally at 50 is installed in the interior of the assembly 10. The pump plate 50 is positioned on a shoulder 52 of the housing 26 and is drivingly secured to the housing 26 by the cover 40. The pump plate 50 divides the interior of the assembly 10 into a working chamber 54 and the fluid reservoir 42. In the view of FIG. 1, the working chamber 54 is the interior volume to the left of the pump plate 50, while the reservoir 42 is the interior volume to the right of the pump plate 50. For purposes of this specification, a first or rear surface 56 of the pump plate 50 is in communication with the working chamber 54 and a second or front surface 58 of the pump plate 50 is in communication with the reservoir 42. The pump plate 50 includes a central depression 60 which is fitted in the hub portion 18 of the clutch plate 16.

A pair of diametrically-opposed gates or ports 62 are provided in a portion of the pump plate 50 outbound of the depression 60. Hydraulic pressure causes the flow of fluid through the gates 62 from the reservoir 42 into the working chamber 54.

A rotatable control arm 64 controls the flow of fluid into the working chamber 54 by covering and uncovering the gates 62. The control arm 64 is drivingly connected to a shaft 66, which is rotatably mounted in a tubular hub 68 formed in the cover 40. An O-ring seal 70 is mounted in an annular groove in the shaft 66 and makes peripheral contact with the inner wall of the hub 68 to prevent fluid leakage to the exterior of the assembly 10. A spring 72 is drivingly connected to the shaft 66 to maintain a contact seal by the control arm 64 at the gates 62. Such a spring is disclosed in the allowed U.S. application Ser. No. 404,536, assigned to the present assignee, and hereby incorporated by reference.

A bimetallic coil 74 is mounted at a first end 76 in a slot 78 on the forward end of the shaft 66. A second end 80 of the bimetallic coil 74 is mounted in a tab 82 in the exterior of the cover 40. Preferably, the bimetallic coil 74 is recessed within a cavity 84 surrounding the hub 68. The bimetallic coil 74 responds to the ambient air temperature surrounding the cover 40. An increase in air temperature causes the coil 74 to expand, thereby rotating the shaft 66 and the control arm 64 to uncover the gates 62 in the pump plate 50. When the air temperature has decreased to a predetermined level, the bimetallic coil 74 contracts, causing the shaft 66 and control arm 64 to rotate back to their original positions, thereby covering the gates 62 in the pump plate 50 and blocking fluid flow.

A fluid shear zone 86 (FIG. 2) is formed by the space between the interleaved concentric annular lands or ridges 88 and grooves formed on a rear or inner surface of the disk portion 20 of the clutch plate 16 and corresponding concentric annular lands or ridges 90 and grooves formed on an interior surface of the housing 26. Fluid sheared in the shear zone 86 transmits input torque from the rotatably driven clutch plate 16 to provide hydraulic drive of the housing 26 and the attached fan 34.

Figure 2:
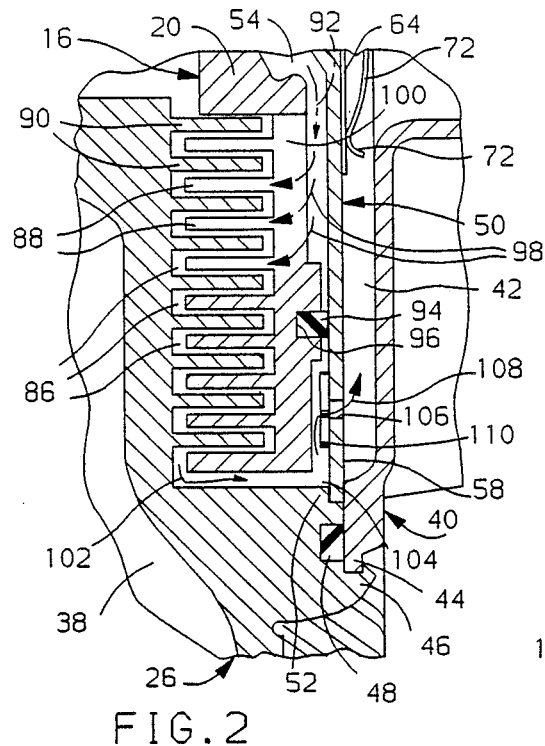
FIG. 2 is an enlarged view of a portion of the clutch assembly of FIG. 1 wherein the pump plate has been rotated to illustrate fluid flow from the pumping chamber through a discharge orifice to the reservoir.

Fluid flow through the shear zone 86 is illustrated in FIG. 2 with directional arrows. When the control arm 64 is rotated to uncover the gates 62, fluid flows from the reservoir 42 into the working chamber 54. Centrifugal forces of the rotating clutch assembly 10 direct the fluid into a radial flow as indicated at directional arrow 92 between the pump plate 50 and the clutch plate 16. A blocking ring 94, preferably formed from TEFLON or a similar material, is provided in an annular groove 96 in a front surface of the clutch plate 16. Radial flow 92 encounters the blocking ring 94 and is redirected to axial flow indicated at directional arrows 98 to flow through a plurality of passages 100 provided in the ridges 88 and grooves of the clutch plate 16. Centrifugal forces cause the fluid to be dispersed radially outwardly throughout the shear zone 86. Fluid friction in the shear zone 86 transmits the rotation of the clutch plate 16 to the housing 26. As the housing 26 rotates, the attached fan 34 is rotated to draw cooling air through a radiator (not illustrated) and cool an internal combustion engine in a well-known manner.

Fluid exits the shear zone 86 as indicated at directional arrow 102 into an annular pumping chamber 104 formed and bounded by the clutch plate 16, the pump plate 50 and the blocking ring 94. Fluid is pumped from the pumping chamber 104 back to the reservoir 42 through a single discharge orifice 106 as indicated by directional arrow 108.

Figure 3:
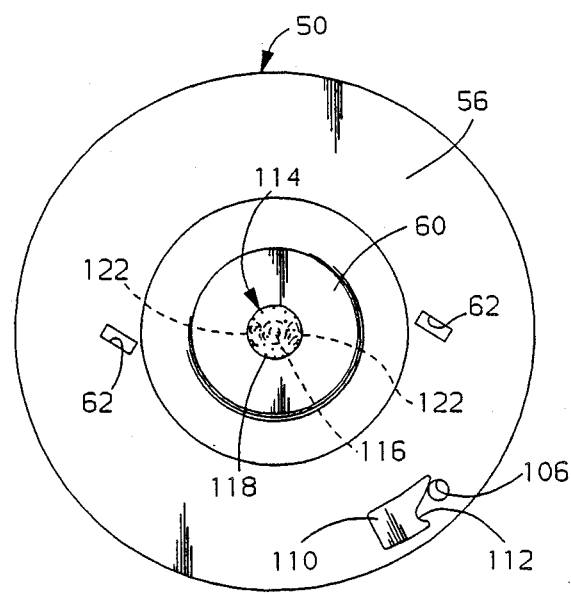
FIG. 3 is a reduced rear elevational view of the present pump plate, removed from the clutch assembly of FIG. 1 for purposes of clarity of illustration, illustrating a single discharge orifice and associated wiper, a pair of diagonally-opposed fluid gates and a first embodiment of an airflow check valve.

As illustrated best in FIG. 3, the discharge orifice is provided radially outbound of the gates 62. To improve pumping efficiency, a well-known wiper 110 can be mounted on the rear surface 56 of the pump plate 50 adjacent the discharge orifice 106. The wiper 110 can include a scoop surface 112 and is mounted upstream of the discharge orifice 106. As viewed in FIG. 3, a counterclockwise rotation of the pump plate 50 forces fluid into the scoop surface 112, thereby increasing fluid pressure in the pumping chamber 104 and the rate of fluid flow 108 through the discharge orifice 106. In other embodiments, the wiper 110 can be formed by any suitable means, e.g., as a projecting element stamped or pressed into the pump plate 50.

An airflow check valve indicated generally at 114 is mounted at a central opening 116 provided in the pump plate 50. The check valve 114 is preferably an umbrella valve formed from a flexible material capable of sealing airflow, e.g., rubber, and includes a flexible cap 118 and a resilient bulb 120. The bulb 120 is forced through the central opening 116 to removably mount the check valve 114 on the pump plate 50. The cap 118 is in contact with the pump plate rear surface 56 and covers a pair of air vents 122 provided in the pump plate 50 adjacent the central opening 116. The vents 122 permit the passage of air contained in the clutch assembly 10 to pass from the reservoir 42 to the working chamber 54 as described below. While the vents 122 are illustrated as arcuate openings in the drawings, other shapes are within the scope of this invention.

FIG. 4 is a partial view of the present clutch assembly 10 after it has stopped rotating and is not in operation. In nearly all cases, the clutch assembly 10 has achieved the desired cooling when the engine is shut off. At this point, the bimetallic coil 74 has unwound, thereby causing the shaft 66 and control arm 64 to rotate and cover the gates 62 on the pump plate 50. Fluid is blocked from entering the working chamber 54 and is pumped from the shear zone 86 and pumping chamber 104 back into the reservoir 42 through the discharge orifice 106. All but a small fraction of the viscous fluid 124 (indicated by the horizontal lines) in the clutch assembly 10 is in the reservoir 42. Gravity and fluid pressures in the clutch assembly 10 act to cause the fluid 124 to seek an equilibrium point. For example, the fluid level marked by line A in the reservoir 42 is substantially higher than the fluid level marked by line B in the shear zone 86. In conventional clutch assemblies, the fluid 124 will seek equilibrium so that fluid levels A and B lie in substantially the same plane.

In many instances, the discharge orifice 106 will come to rest at a point above line A. When such is the case, fluid cannot travel from the reservoir 42 back into the working chamber 104. However, when the discharge orifice 106 rests below line A, the fluid 124 tends to migrate and travel through the discharge orifice 106 from the reservoir 42 into the pumping chamber 104. As the fluid 124 begins to enter the pumping chamber 104, and thus the working chamber 54, the air which fills the remaining volume of the working chamber 54 must be displaced. In conventional viscous fluid clutches, the air travels from the working chamber 54 to the reservoir 42 through the central opening 116 in the pump plate 50. However, in the present invention, the air vents 122 are covered and sealed by the check valve 114. Broken directional arrows 126 illustrate the blockage of airflow in the working chamber 54 by the check valve 114. As a result, a vacuum is created in the reservoir 42 so that fluid 124 is not permitted to reach a complete equilibrium as would otherwise be obtained without the check valve 114. The vacuum enhances the seal at the air vents 122 and prevents a substantial portion of the fluid 124 from migrating into the shear zone 86, thereby eliminating undesirable engagement of the clutch assembly 10 when the engine is next started.

FIG. 5 is a view similar to FIG. 4 and illustrates fluid levels in the reservoir 42 and working chamber 54 shortly after start-up of the clutch assembly 10. At this point, most of the small amount of the fluid 124 which seeped back into the pumping chamber 104 is pumped out through the discharge orifice 106. The fractional volume of fluid 124 remaining in the pumping chamber 104 does not generate enough shear to cause the rotation of the clutch plate 16. Thus, the cooling fan 34 is not rotated at high speeds.

Whenever the fluid 124 travels from the pumping chamber 104 into the reservoir 42, air in the reservoir 42 is displaced through the air vents 122 into the working chamber 54. As indicated by broken directional arrows 128, the flexible cap 118 of the check valve 114 lifts off the vents 122 as the air 128 passes through the vents 122. When air pressure in the reservoir 42 is reduced, the cap 118 returns to its original position to cover the air vents 122. Aerated fluid in the working chamber 54 permits the passage of air from the working chamber 54 to the reservoir 42.

Figure 6:
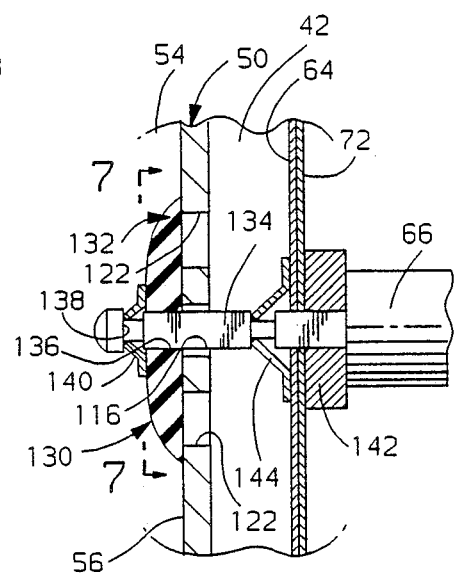
FIG. 6 is a greatly enlarged sectional view of a second embodiment of the airflow check valve comprising a rotatable valve plate drivingly connected to the control shaft to cover and seal airflow vents in the partially illustrated pump plate.
Figure 7:
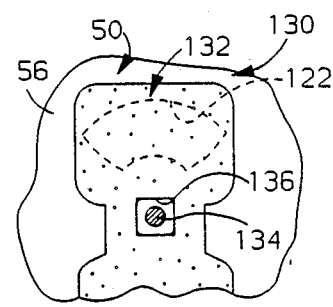
FIG. 7 is a fragmentary sectional view taken along line 7—7 of FIG. 6 of the valve plate and control shaft.

FIGS. 6 and 7 illustrate a second embodiment of an airflow check valve assembly 130. A flexible valve plate 132 is drivingly connected to the shaft 66 by an extension 134 which passes through the central opening 116 and projects into the working chamber 54. The extension 134 can be integrally formed with or drivingly connected to the shaft 66 as desired. In FIGS. 6 and 7, a central opening 136 in the valve plate 132 is keyed to the cross section of the extension 134. A groove 138 provided adjacent the inner end of the extension 134 acts as a seat for a retaining washer 140 which urges the valve plate 132 against the rear surface 56 of the pump plate 50 to cover the air vents 122. A shoulder washer 142 and a spring washer 144 are used to hold the control arm 64 and spring 72 onto the shaft 66.

In this manner, the extension 134 and the valve plate 132 are rotated as the shaft 66 and the control arm 64 are rotated by the bimetallic coil 74. When cooling is required from the clutch assembly 10, the bimetallic coil 74 causes the control arm 64 to rotate, thereby opening the gates 62 and rotating the valve plate 132 to open the air vents 122. Fluid passes from the reservoir 42 into the working chamber 54 to engage the clutch plate 16. At the same time, displaced air in the working chamber 54 is free to travel through the open air vents 122. When the bimetallic coil 74 unwinds, the control arm 64 is rotated back the opposite direction and, at the same time, the valve plate 132 is rotated back to close the air vents 122. At this point, fluid in the shear zone 86 and the pumping chamber 104 is pumped into the reservoir 42.

When an engine is shut off, fluid tends to migrate back through the discharge orifice 106 from the reservoir 42 into the pumping chamber 104. However, in a manner similar to that described for the check valve 114 of FIGS. 1-5, air in the working chamber cannot pass through the air vents 122 which are blocked by the valve plate 132. Thus, a vacuum is created in the reservoir 42 which prevents the fluid from reaching an equilibrium in the reservoir 42 and working chamber 104. As a result, substantial fluid cannot bleed back into the shear zone 86 to cause undesirable and unwanted high-speed rotation of the clutch assembly 10 upon start-up of the engine.

The present invention provides an economical apparatus and method for preventing fluid from seeking an equilibrium point in the reservoir 46 and working chamber 104 of a viscous fluid clutch assembly 10 when the assembly is at rest. The benefit of such prevention results in the elimination of undesirable high-speed clutch assembly 10 operation and its accompanying fan noise when an engine is first started. The present airflow check valves 114 and 130 and a single-hole discharge orifice 106 create a vacuum which prevents substantial fluid migration in the clutch assembly 10.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for dividing the interior of a viscous fluid clutch into a reservoir and a working chamber, wherein the working chamber includes a pumping chamber adjacent the outer periphery of the pump plate assembly for returning viscous fluid from a shear zone back into the reservoir, the pump plate comprising:
   (a) a plate member having
      (i) a front surface in communication with the reservoir,
      (ii) a rear surface in communication with the working chamber,
      (iii) at least one fluid gate provided radially inbound of the pumping chamber to permit selective flow of viscous fluid from the reservoir to the working chamber,
      (iv) only one discharge orifice provided in communication with the pumping chamber to permit flow of viscous fluid from the pumping chamber to the reservoir, and
      (v) vent means provided radially inbound of the pumping chamber to permit the passage of air between the reservoir and the working chamber; and
   (b) check valve means provided at the vent means to permit selective airflow between the reservoir and the working chamber.

2. The pump plate assembly as specified in claim 1 wherein the check valve means comprises a flexible valve removably mounted in a central opening provided in the plate member adjacent the vent means.

3. The pump plate assembly as specified in claim 2 wherein the valve comprises an umbrella valve having a resilient bulb and a flexible cap, wherein the bulb is received in the central opening so that the cap engages the rear surface of the plate member and sealingly covers the vent means to permit only one-way passage of air from the reservoir to the working chamber through the vent means.

4. The pump plate assembly as specified in claim 1 wherein the check valve means comprises a selectively rotatable valve plate sealingly covering the vent means, whereby upon rotation of the valve plate, the vent means are opened to permit the passage of air between the reservoir and the working chamber.

5. A viscous fluid clutch assembly comprising:
   (a) an input shaft adapted to be rotatably driven;
   (b) a clutch plate, rotatably driven by the input shaft, having a plurality of axially extending and concentric lands forming grooves therebetween;
   (c) housing means, rotatably mounted on the input shaft, having a plurality of axially extending and concentric lands forming grooves therebetween, the body lands and grooves mated with the clutch plate lands and grooves to form a shear zone;
   (d) a pump plate, mounted within the housing means for dividing the interior volume of housing means into a fluid reservoir and a working chamber, wherein the working chamber engulfs the clutch plate and the pump plate includes a plurality of fluid gates for permitting fluid flow from the reservoir to the working chamber;
   (e) a rotatable shaft mounted in the housing means;
   (f) means for selectively rotating the shaft connected to the shaft;
   (g) a rotatable control arm drivingly connected to the shaft and slidable against the pump plate to cover the pump plate fluid gates upon rotation of the shaft to prevent fluid flow through the orifices;
   (h) an annular pumping chamber defined by the housing means and outer periphery of the pump plate and clutch plate, wherein the pumping chamber receives fluid exiting the shear zone;
   (i) one discharge orifice provided in the pump plate outer periphery in communication with the pumping chamber and the reservoir to permit the passage of fluid from the pumping chamber to the reservoir;
   (j) vent means provided in the pump plate inbound of the pumping chamber to permit the passage of air between the reservoir and the working chamber; and
   (k) check valve means provided at the vent means to permit selective airflow between the reservoir and the working chamber.

6. The viscous fluid clutch as specified in claim 5 wherein the check valve means comprises a resilient umbrella valve removably mounted on the pump plate adjacent the vent means to permit only one-way airflow from the reservoir to the working chamber.

7. The viscous fluid clutch as specified in claim 5 wherein the check valve means comprises a rotatable valve plate drivingly connected to the shaft.

8. A method of inhibiting the migration of a viscous fluid in a viscous fluid clutch assembly from a reservoir to a working chamber when the clutch assembly is at rest, the method comprising the steps of:
   (a) separating the reservoir from the working chamber by a pump plate;
   (b) providing a pumping chamber in communication with the working chamber near the outer periphery of the pump plate wherein viscous fluid is collected before being returned to the reservoir;
   (c) providing only one discharge orifice in the pump plate to provide a passage for fluid from the pumping chamber to the reservoir;
   (d) providing vents means in the pump plate inbound of the pumping chamber to provide a passage for air between the reservoir and the working chamber; and
   (e) mounting check valve means adjacent the vent means to permit selective passage of air between the reservoir and the working chamber.

* * * * *